(12) United States Patent
Kato et al.

(10) Patent No.: US 10,710,570 B2
(45) Date of Patent: Jul. 14, 2020

(54) CONTROL SYSTEM FOR HYBRID VEHICLE (71) Applicant: TOYOTA JIDOSHA KABUSHIKI KAISHA, Toyota-shi, Aichi-ken (JP)

(72) Inventors: Naoto Kato, Susono (JP); Tomoya Ota, Nagoya (JP); Keisuke Sasaki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/359,405

(22) Filed: Mar. 20, 2019

(65) Prior Publication Data

US 2019/0344773 A1   Nov. 14, 2019

(30) Foreign Application Priority Data

May 11, 2018   (JP) ................. 2018-092433

(51) Int. Cl.
*B60W 20/11* (2016.01)
*B60L 50/16* (2019.01)
*B60W 10/06* (2006.01)
*B60W 10/08* (2006.01)
*B60W 20/15* (2016.01)
*B60W 20/40* (2016.01)
*F02D 9/02* (2006.01)

(52) U.S. Cl.
CPC .......... *B60W 20/11* (2016.01); *B60L 50/16* (2019.02); *B60W 10/06* (2013.01); *B60W 10/08* (2013.01); *B60W 20/15* (2016.01); *B60W 20/40* (2013.01); *B60W 2400/00* (2013.01); *B60W 2510/0604* (2013.01); *B60W 2510/0628* (2013.01); *B60W 2510/0657* (2013.01); *F02D 2009/0201* (2013.01)

(58) Field of Classification Search
CPC ............... B60W 10/06; B60L 2240/44; B60L 2240/441; B60L 2240/443
USPC ........................................ 180/65.28
See application file for complete search history.

(56) References Cited

U.S. PATENT DOCUMENTS 5,478,293 A * 12/1995 Yonezawa ............ B60W 10/06
477/107
5,622,050 A *  4/1997 Ishino ..................... F16H 47/04
475/76

(Continued)

FOREIGN PATENT DOCUMENTS

JP    2012-017679 A    1/2012
JP    2017-013583 A    1/2017
WO   2013/018895 A1    2/2013

*Primary Examiner* — Jeffrey J Restifo
(74) *Attorney, Agent, or Firm* — Oliff PLC (57) ABSTRACT

There is a control system for a hybrid vehicle including an internal combustion engine including a throttle valve on an intake air passage, and a generator coupled to an output shaft of the engine. The control system includes a controller. The controller is configured to detect shaft torque of the output shaft of the engine by the generator, calculate an actual value of a throttle flow rate based on the shaft torque, the flow rate being an amount of air that flows through the throttle valve, and learn flow rate characteristics indicating a relationship between a throttle opening being a degree of opening of the throttle valve and the throttle flow rate, based on an actual value of the throttle opening and the actual value of the throttle flow rate.

7 Claims, 7 Drawing Sheets

(56) References Cited

U.S. PATENT DOCUMENTS

| | | | | |
|---|---|---|---|---|
| 6,269,294 B1* | 7/2001 | Saito | ............ | B60W 10/06 |
| | | | | 477/906 |
| 8,095,299 B2* | 1/2012 | Martin | ............ | B60W 10/06 |
| | | | | 701/113 |
| 8,287,431 B2* | 10/2012 | Kobayashi | ............ | B60W 10/06 |
| | | | | 477/110 |
| 8,376,908 B2* | 2/2013 | Tsuzuki | ............ | B60W 10/02 |
| | | | | 477/181 |
| 9,020,670 B2* | 4/2015 | Abihana | ............ | B60W 10/06 |
| | | | | 180/65.28 |
| 9,150,213 B2* | 10/2015 | Ishikawa | ............ | B60W 10/06 |
| 9,249,739 B2* | 2/2016 | Smith | ............ | F02D 11/105 |
| 9,267,449 B2* | 2/2016 | Kaiser | ............ | F02D 11/105 |
| 9,341,150 B2* | 5/2016 | Whitney | ............ | F02D 11/105 |
| 9,371,070 B2* | 6/2016 | Chinbe | ............ | B60W 10/06 |
| 9,527,513 B2* | 12/2016 | Hattori | ............ | B60W 30/188 |
| 9,528,453 B2* | 12/2016 | Whitney | ............ | F02D 41/28 |
| 9,534,547 B2* | 1/2017 | Livshiz | ............ | F02D 13/0219 |
| 9,555,810 B2* | 1/2017 | Shirasaki | ............ | B60W 10/11 |
| 9,765,703 B2* | 9/2017 | Whitney | ............ | F02D 11/105 |
| 9,803,573 B2* | 10/2017 | Naik | ............ | F02D 41/0087 |
| 10,060,336 B1* | 8/2018 | Wicks | ............ | F01L 13/08 |
| 10,077,041 B1* | 9/2018 | Wicks | ............ | F02D 35/027 |
| 10,288,021 B2* | 5/2019 | Luehrsen | ............ | B60T 13/46 |
| 10,351,164 B2* | 7/2019 | Ogawa | ............ | B62D 5/0463 |
| 10,364,767 B2* | 7/2019 | Tsunoda | ............ | B60W 20/10 |
| 10,450,972 B2* | 10/2019 | Pochner | ............ | F02D 41/1406 |
| 10,519,880 B2* | 12/2019 | Pisu | ............ | F02D 41/0007 |

* cited by examiner

CONTROL SYSTEM FOR HYBRID VEHICLE

CROSS-REFERENCE TO RELATED APPLICATION

The present disclosure claims priority under 35 U.S.C. § 119 to Japanese Patent Applications No. 2018-092433, filed on May 11, 2018. The contents of these applications are incorporated herein by reference in their entirety.

FIELD

The present disclosure relates to a control system for a hybrid vehicle.

BACKGROUND

A flow rate of intake air that is detected by an airflow meter at a predetermined throttle opening changes depending on individual differences in detection characteristics of sensors, a state of adhesion of deposit to a throttle valve, and the like. For example, according to a technique disclosed in JP 2012-17679 A, a flow rate change rate of intake air flowing through a throttle valve is learned as a learning value, for each of opening regions divided according to a throttle opening. The accuracy of control of an intake air flow rate may thereby be increased.

SUMMARY

However, the above-described conventional technique has the following problem. That is, the above-described conventional technique requires an airflow meter to learn flow rate characteristics of intake air that flows through the throttle valve. If a flow rate through a throttle may be acquired without using an airflow meter, the flow rate characteristics of intake air that flows through the throttle valve may be learned with a simple configuration.

The present disclosure is made in the light of the problem as described above, and its object is to provide a control system, for a hybrid vehicle, which is capable of learning flow rate characteristics of intake air flowing through a throttle, without using an airflow meter.

In order to attain the above object, a first aspect of the present disclosure is applied to a control system for a hybrid vehicle including an internal combustion engine including a throttle valve on an intake air passage, and a generator coupled to an output shaft of the engine. The control system includes a controller. The controller is configured to detect shaft torque of the output shaft of the engine by the generator, calculate an actual value of a throttle flow rate based on the shaft torque, the flow rate being an amount of air that flows through the throttle valve, and learn flow rate characteristics indicating a relationship between a throttle opening being a degree of opening of the throttle valve and the throttle flow rate, based on an actual value of the throttle opening and the actual value of the throttle flow rate.

A second aspect of the present disclosure is the first aspect further including the following feature.

The controller is configured to calculate a loss torque that is lost at the engine, calculate an indicated torque that is torque generated by combustion in the engine, by adding the loss torque to the shaft torque, and calculate the actual value of the throttle flow rate based on the indicated torque.

A third aspect of the present disclosure is the second aspect further including the following feature.

In a case where an operation state of the engine is in a predetermined knocking region, the engine performs ignition timing retard control of retarding an ignition timing from an optimal ignition timing The controller is configured to perform correction by adding, to the indicated torque, torque corresponding to an amount of reduction in ignition timing efficiency caused by the ignition timing retard control, based on an ignition timing retard amount from the optimal ignition timing caused by the ignition timing retard control.

A fourth aspect of the present disclosure is the second aspect further including the following feature.

The controller is configured to inhibit learning of the flow rate characteristics, in a case where a temperature index value indicating a degree of warm-up of the engine is lower than a predetermined temperature determination value.

A fifth aspect of the present disclosure is the first aspect further including the following feature.

The controller is configured to inhibit learning of the flow rate characteristics, in a case where an amount of temporal change in an engine speed of the engine is greater than a predetermined determination speed.

A sixth aspect of the present disclosure is the first aspect further including the following feature.

The controller is configured to inhibit learning of the flow rate characteristics, in a case where an operation state of the engine is in a predetermined knocking region.

A seventh aspect of the present disclosure is the first aspect further including the following feature.

The controller is configured to detect the shaft torque in a period when all of the shaft torque of the engine is transmitted to the generator.

According to the first aspect, the shaft torque of the output shaft of the internal combustion engine is detected by using the generator provided in the hybrid vehicle. The actual value of the throttle flow rate is calculated based on the detected shaft torque. Accordingly, with the present aspect, the throttle flow rate may be calculated without using an airflow meter, and the flow rate characteristics of the throttle valve may be learned with a simple configuration.

According to the second aspect, the indicated torque that is generated by combustion in the internal combustion engine is calculated by adding the loss torque to the shaft torque. Moreover, the actual value of the throttle flow rate is calculated based on the calculated indicated torque. Accordingly, with the present aspect, the throttle flow rate may be accurately calculated based on the indicated torque that is generated by combustion in the internal combustion engine.

According to the third aspect, in a case where the operation state of the internal combustion engine is in the predetermined knocking region, torque corresponding to the amount of reduction in ignition timing efficiency caused by ignition timing retard is added to the indicated torque. Accordingly, even in a case where the operation state of the internal combustion engine is in the predetermined knocking region, the throttle flow rate may be accurately calculated.

According to the fourth aspect, learning of the flow rate characteristics of the throttle valve is inhibited during warm-up of the internal combustion engine. Learning of the flow rate characteristics is thereby prevented from being performed when an error is likely to be superimposed on the indicated torque of the internal combustion engine, and accuracy of learning may be increased.

According to the fifth aspect, learning of the flow rate characteristics of the throttle valve is inhibited when the amount of temporal change in the engine speed is greater than the determination speed. Learning is thereby prevented from being performed when an error is likely to be superimposed on the detected shaft torque, and accuracy of learning may be increased.

According to the sixth aspect, learning of the flow rate characteristics of the throttle valve is inhibited, in a case where the operation state of the internal combustion engine is in the predetermined knocking region. Learning may thereby be inhibited when the ignition timing efficiency is reduced due to ignition timing retard, and reduction in accuracy of learning may be suppressed.

According to the seventh aspect, the shaft torque is detected during the period when all of the shaft torque of the internal combustion engine is transmitted to the generator. The shaft torque of the internal combustion engine may thereby be accurately detected by the generator.

DESCRIPTION OF EMBODIMENTS

Hereinafter, embodiments of the present disclosure will be described with reference to the drawings. The present disclosure is not limited to the number of pieces, the quantity, the amount, the range and the like of respective elements mentioned in the following embodiments, unless specifically specified otherwise or unless the disclosure is explicitly and theoretically specified by such numerals. Furthermore, structures, steps and the like described in the following embodiments are not always indispensable to the disclosure, unless specially specified otherwise or unless the disclosure is explicitly and theoretically specified by such structures, steps and the like.

1. First Embodiment 1-1. Configuration of First Embodiment

Figure 1:
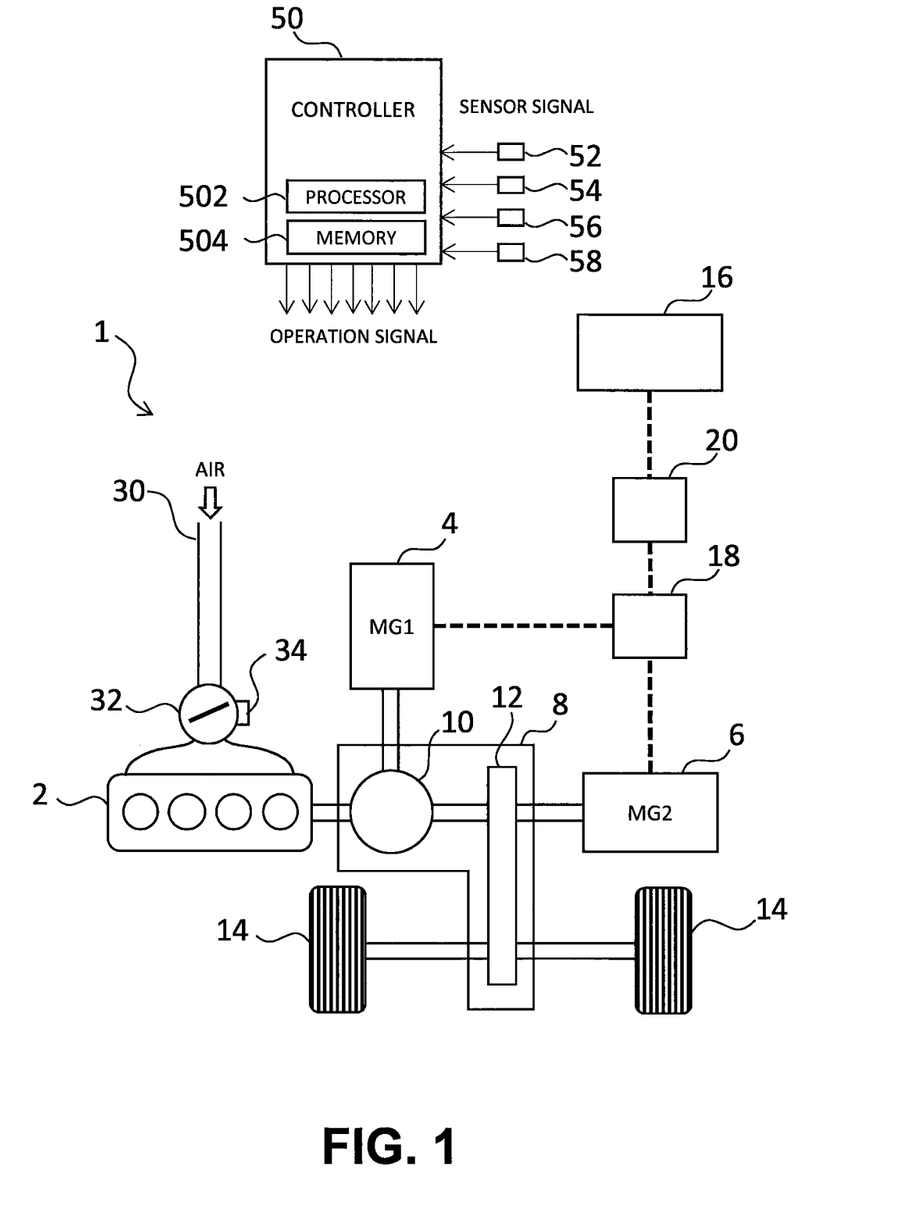
FIG. 1 is a diagram illustrating a configuration for a hybrid vehicle to which a control system of a first embodiment is applied.

FIG. 1 is a diagram illustrating a configuration for a hybrid vehicle to which a control system of a first embodiment is applied. As illustrated in FIG. 1, a hybrid vehicle 1 includes an engine 2 as one power device for rotating wheels 14. The engine 2 is an internal combustion engine that outputs power by combustion of hydrocarbon fuel such as gasoline or light oil, and includes an intake device, an exhaust device, a fuel injection device, an ignition device, a cooling device, and the like. An intake air passage 30 forming the intake device is provided with a throttle valve 32 for adjusting an amount of suction air. The throttle valve 32 is provided with a throttle opening sensor 34 for detecting a throttle opening indicating a degree of opening of the throttle valve 32. Although details will be given later, the engine 2 is not provided with an airflow meter for detecting the amount of suction air.

As another power device for rotating the wheels 14, the hybrid vehicle 1 includes a first motor-generator 4 and a second motor-generator 6, which are motors capable of generating electric power. The first motor-generator 4 and the second motor-generator 6 are AC synchronous generator-motors having a function of a motor for outputting torque by supplied electric power, and a function of a generator for converting input mechanical power into electric power. The first motor-generator 4 is mainly used as the generator, and the second motor-generator 6 is mainly used as the motor.

An output shaft of the engine 2, an output shaft of the first motor-generator 4, and an output shaft of the second motor-generator 6 are connected to the wheels 14 by a power transmission mechanism 8. The power transmission mechanism 8 includes a power distribution mechanism 10 and a reduction mechanism 12. The power distribution mechanism 10 is a planetary gear unit, for example, and splits torque that is output from the engine 2 between the first motor-generator 4 and the wheels 14. The torque that is output from the engine 2, or torque that is output from the second motor-generator 6 is transmitted to the wheels 14 through the reduction mechanism 12.

The first motor-generator 4 regenerates electric power by torque that is supplied through the power distribution mechanism 10. By performing electric power regeneration by the first motor-generator 4 in a state where torque is not output from the engine 2 or the second motor-generator 6, a regenerative braking force is transmitted from the first motor-generator 4 to the wheels 14 through the power transmission mechanism 8, and the hybrid vehicle 1 is decelerated. That is, regenerative braking of the hybrid vehicle 1 may be performed by the first motor-generator 4.

The first motor-generator 4 and the second motor-generator 6 transmit or receive electric power to/from a battery 16 through an inverter 18 and a converter 20. The inverter 18 is designed to cause electric power generated by one of the first motor-generator 4 and the second motor-generator 6 to be consumed by the other of the first motor-generator 4 and the second motor-generator 6. The inverter 18 converts electric power stored in the battery 16 from DC to AC and supplies the AC to the second motor-generator 6, and also, converts electric power generated by the first motor-generator 4 from AC to DC, and stores the DC in the battery 16. Accordingly, the battery 16 is charged or discharged based on electric power that is generated by one of the first motor-generator 4 and the second motor-generator 6 or insufficiency of electric power.

The hybrid vehicle 1 includes a controller 50 for controlling traveling of the hybrid vehicle 1 by controlling operation of the engine 2, the first motor-generator 4, the second motor-generator 6, the power distribution mechanism 10, and the like. The controller 50 is an electronic control unit (ECU) including at least one processor 502 and at least one memory 504. The memory 504 stores various programs for controlling traveling of the hybrid vehicle 1, and various pieces of data including maps. Various functions of the controller 50 are realized when programs stored in the memory 504 are executed by the processor 502. Suction air amount control, fuel injection control, ignition timing control and the like for the engine 2 are performed by the controller 50. Power running control of causing the first motor-generator 4 or the second motor-generator 6 to function as a motor, and regenerative control of causing the first motor-generator 4 or the second motor-generator 6 to function as a generator are also performed by the controller 50. Additionally, the controller 50 may be configured of a plurality of ECUs.

The controller 50 captures and processes signals from sensors provided in the hybrid vehicle 1. The sensors are mounted at respective positions of the hybrid vehicle 1. In addition to the throttle opening sensor 34 described above, a rotational speed sensor 52 for detecting a rotational speed of a crank shaft, an accelerator position sensor 54 for outputting a signal according to a depression amount of an accelerator pedal as a degree of accelerator opening, a vehicle speed sensor 56 for detecting a vehicle speed, a water temperature sensor 58 for detecting an engine water temperature, and the like are mounted on the hybrid vehicle 1. Many other sensors, not illustrated, are connected to the controller 50, but a description thereof in the present specification is omitted. The controller 50 executes various programs by using captured sensor signals, and outputs operation signals for operating an actuator.

1-2. Operation of First Embodiment
1-2-1. Outline of Learning Control

Flow rate characteristics of intake air that flows through the throttle valve 32 change when deposit or the like adheres to the throttle valve 32. Accordingly, the controller 50 performs learning control of learning flow rate characteristics setting a relationship between a degree of throttle opening of the throttle valve 32 and a throttle flow rate, which is a temporal flow rate through the throttle valve.

Figure 2:
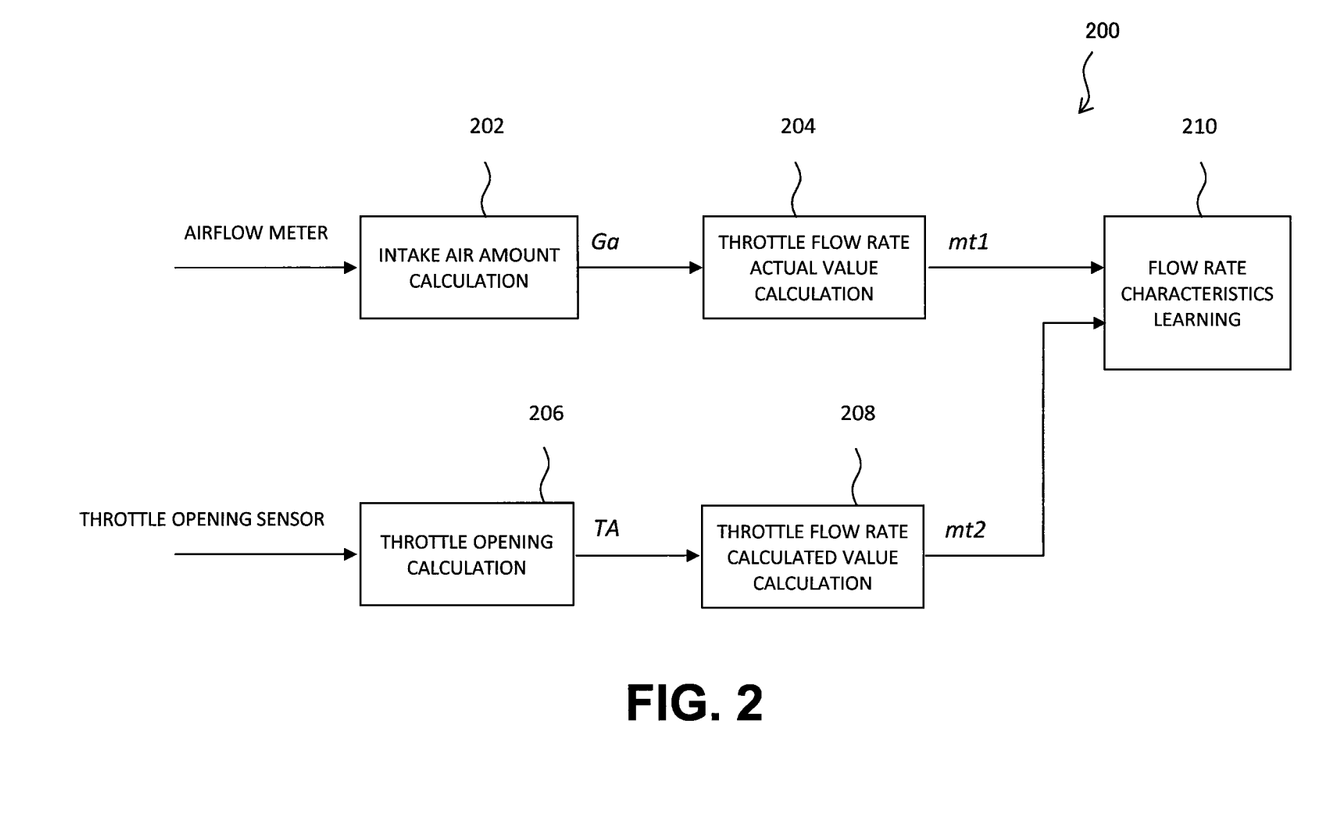
FIG. 2 is a functional block diagram illustrating a configuration of a controller for performing learning control according to a comparative example.

In learning control, the amount of intake air that flows through the throttle valve 32 is desired to be accurately grasped. In a general system, an airflow meter is used to grasp the amount of intake air. To clarify the basic operation of learning control, learning control that uses the airflow meter will be cited as a comparative example. FIG. 2 is a functional block diagram illustrating a configuration of a controller for performing learning control according to the comparative example. A controller 200 of the comparative example illustrated in the drawing includes, as functional blocks for performing learning control, an intake air amount calculation unit 202, a throttle flow rate actual value calculation unit 204, a throttle opening calculation unit 206, a throttle flow rate calculated value calculation unit 208, and a learning unit 210.

The intake air amount calculation unit 202 is a functional block for calculating an amount of intake air Ga by using a detection value of an airflow meter provided on an intake air passage. The amount of intake air Ga calculated by the intake air amount calculation unit 202 is output to the throttle flow rate actual value calculation unit 204. The throttle flow rate actual value calculation unit 204 is a functional block for calculating an actual value mt1 of a throttle flow rate mt from the actual amount of intake air Ga calculated by the intake air amount calculation unit 202. The throttle flow rate actual value mt1 is an amount obtained by converting the amount of intake air Ga (g) that flows through the throttle valve 32 into a temporal flow rate (g/s). The calculated throttle flow rate actual value mt1 is output to the learning unit 210.

Figure 3:
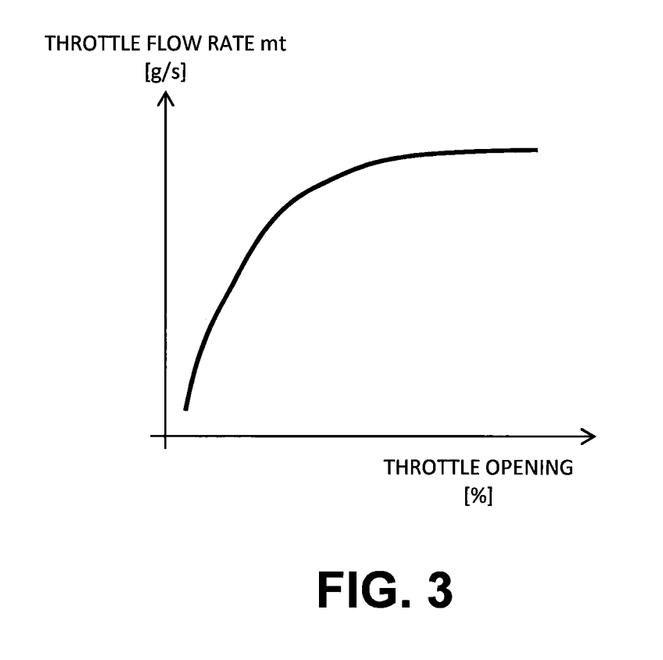
FIG. 3 is an example of a map defining flow rate characteristics of a throttle valve.

The throttle opening calculation unit 206 is a functional block for calculating a degree of throttle opening TA by using a detection value of the throttle opening sensor 34. The degree of throttle opening TA calculated by the throttle opening calculation unit 206 is output to the throttle flow rate calculated value calculation unit 208. The throttle flow rate calculated value calculation unit 208 is a functional block for calculating a calculated value mt2 of the throttle flow rate mt corresponding to the degree of throttle opening TA, by using flow rate characteristics of the throttle valve 32. FIG. 3 is an example of a map defining flow rate characteristics of the throttle valve 32. A relationship of the throttle flow rate mt to the degree of throttle opening TA is uniquely determined in the map illustrated in the drawing. The throttle flow rate actual value calculation unit 204 calculates the throttle flow rate calculated value mt2 corresponding to the degree of throttle opening TA by using the flow rate characteristics illustrated in FIG. 3. The calculated throttle flow rate calculated value mt2 is output to the learning unit 210.

The learning unit 210 is a functional block for learning the relationship between the degree of throttle opening TA and the throttle flow rate mt by comparing the throttle flow rate actual value mt1 input from the throttle flow rate actual value calculation unit 204 and the throttle flow rate calculated value mt2 input from the throttle flow rate calculated value calculation unit 208. When the throttle flow rate actual value mt1 and the throttle flow rate calculated value mt2 are different from each other, the learning unit 210 rewrites the flow rate characteristics such that the throttle flow rate mt corresponding to the degree of throttle opening TA is taken as the throttle flow rate actual value mt1. According to such learning control, the throttle flow rate mt may be accurately calculated from the degree of throttle opening TA, even if deposit or the like adheres to the throttle valve 32.

1-2-2. Feature of System of First Embodiment

As described above, the system of the present embodiment does not include an airflow meter for detecting the amount of intake air. The system of the present embodiment calculates the amount of intake air by using the first motor-generator 4 provided in the hybrid vehicle 1, and performs learning control. In the following, learning control performed by the controller 50 of the present embodiment will be described in greater detail.

Figure 4:
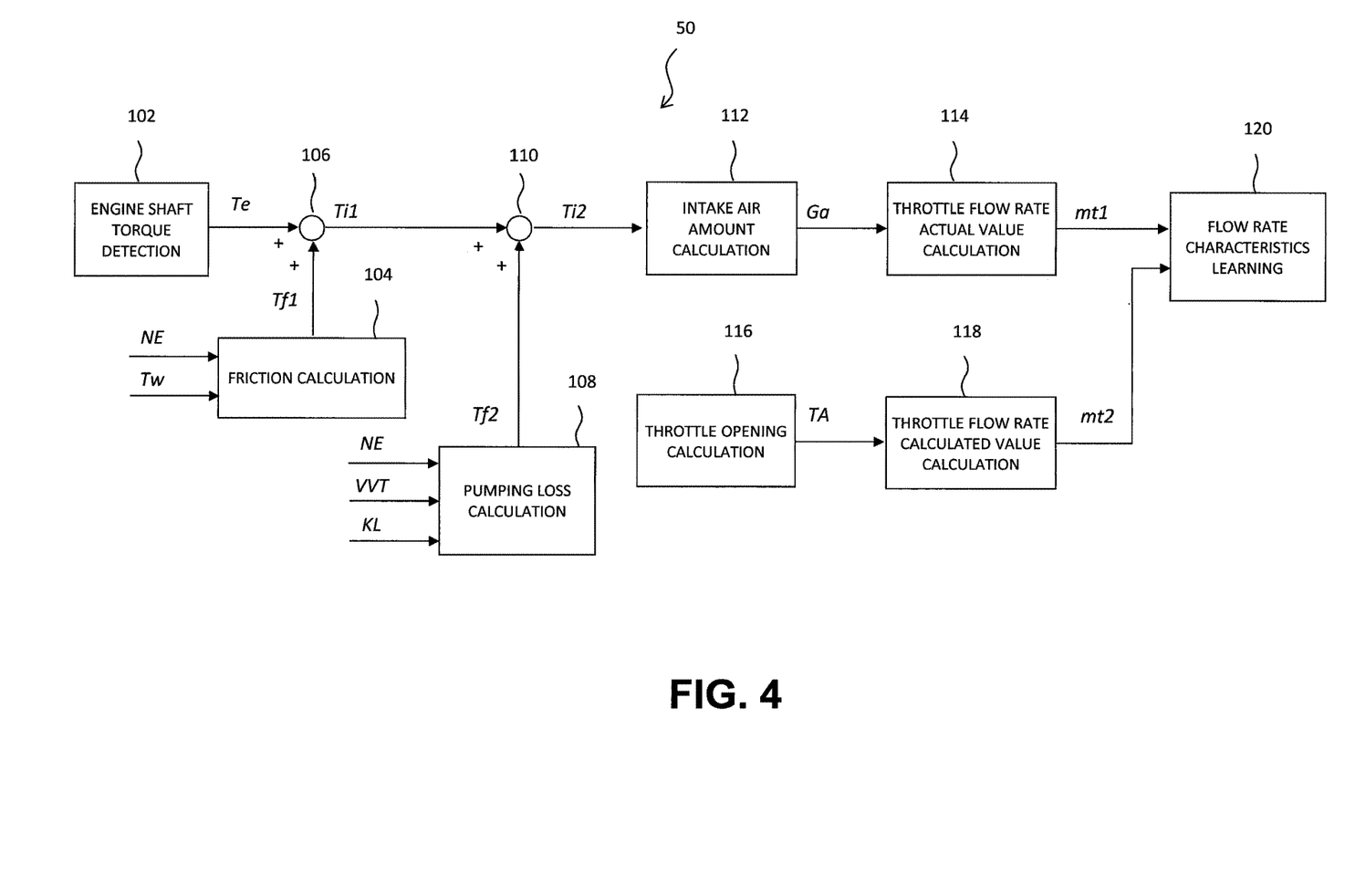
FIG. 4 is a functional block diagram illustrating a configuration of a controller for performing learning control of the first embodiment.

FIG. 4 is a functional block diagram illustrating a configuration of a controller for performing learning control of the first embodiment. A controller 50 illustrated in the drawing includes, as functional blocks for performing learning control, an engine shaft torque detection unit 102, a friction calculation unit 104, a first indicated torque calculation unit 106, a pumping loss calculation unit 108, a second indicated torque calculation unit 110, an intake air amount calculation unit 112, a throttle flow rate actual value calculation unit 114, a throttle opening calculation unit 116, a throttle flow rate calculated value calculation unit 118, and a learning unit 120.

The engine shaft torque detection unit 102 is a functional block for detecting shaft torque Te of the output shaft of the engine 2 by using the first motor-generator 4. In the case where the total amount of the shaft torque Te of the engine 2 is transmitted to the first motor-generator 4 by the power distribution mechanism 10, the shaft torque Te of the engine 2 may be detected by the first motor-generator 4. Accordingly, the engine shaft torque detection unit 102 calculates the shaft torque Te of the engine 2 in the period when all of the shaft torque Te of the engine 2 is being transmitted to the first motor-generator 4 by the power distribution mechanism 10. The calculated shaft torque Te is output to the first indicated torque calculation unit 106.

The friction calculation unit 104 is a functional block for calculating frictional torque Tf1 of the engine 2. The frictional torque Tf1 is torque generated by mechanical friction of the engine 2, such as friction between a piston of the engine 2 and a cylinder inner wall, and includes torque generated by friction of auxiliaries. The frictional torque Tf1 tends to increase as the engine speed NE is increased, and also, tends to increase as the engine water temperature Tw becomes lower. The controller 50 stores a frictional torque calculation map setting a relationship between the engine speed NE, the engine water temperature Tw, and the frictional torque Tf1. The friction calculation unit 104 calculates the frictional torque Tf1 corresponding to input engine speed NE and input engine water temperature Tw, by using the frictional torque calculation map. The calculated frictional torque Tf1 is output to the first indicated torque calculation unit 106.

The first indicated torque calculation unit 106 is a functional block for calculating first indicated torque Ti1 of the engine 2. The first indicated Ti1 is torque that is generated on the output shaft by combustion in the engine 2, and includes a pumping loss Tf2 described later. The first indicated torque calculation unit 106 calculates the first indicated torque Ti1 by the following Equation (1), which uses the shaft torque Te and the frictional torque Tf1 which are input. The calculated first indicated torque Ti1 is output to the second indicated torque calculation unit 110.

$$Ti1 = Te + Tf1 \quad (1)$$

The pumping loss calculation unit 108 is a functional block for calculating the pumping loss Tf2 of the engine 2. The pumping loss Tf2 is torque corresponding to energy that is consumed by pumping work of the engine 2. The pumping loss Tf2 changes according to the engine speed NE, the valve timing VVT of the variable valve timing mechanism, and the engine load KL. The controller 50 stores a pumping loss calculation map setting a relationship between the engine speed NE, the valve timing VVT, the engine load KL, and the pumping loss Tf2. The pumping loss calculation unit 108 calculates the pumping loss Tf2 corresponding to the engine speed NE, the valve timing VVT, and the engine load KL which are input, by using the pumping loss calculation map. The calculated pumping loss Tf2 is output to the second indicated torque calculation unit 110. Additionally, the frictional torque Tf1 and the pumping loss Tf2 are both torque that is lost at the engine 2, and may be referred to as "loss torque".

The second indicated torque calculation unit 110 is a functional block for calculating second indicated torque Ti2 of the engine 2. The second indicated torque Ti2 is torque that is generated on the output shaft by combustion in the engine 2, and is combustion torque not including the pumping loss Tf2. The second indicated torque calculation unit 110 calculates the second indicated torque Ti2 by the following Equation (2), which uses the first indicated torque Ti1 and the pumping loss Tf2 which are input. The calculated second indicated torque Ti2 is output to the intake air amount calculation unit 112.

$$Ti2 = Ti1 + Tf2 \quad (2)$$

Figure 5:
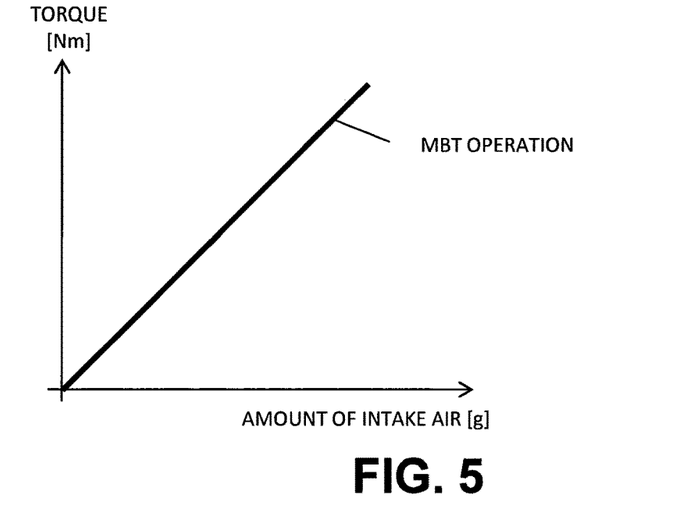
FIG. 5 is a diagram for describing a relationship between an amount of intake air and torque.

The intake air amount calculation unit 112 is a functional block for calculating the amount of intake air Ga from the second indicated torque Ti2. FIG. 5 is a diagram for describing a relationship between the amount of intake air and torque. As illustrated in the drawing, when operation is performed at an optimal ignition timing (MBT), the second indicated torque Ti2 tends to increase in proportion to the amount of intake air Ga. The controller 50 stores an intake air amount calculation map defining a relationship between the amount of intake air Ga and the second indicated torque Ti2 illustrated in FIG. 5. The intake air amount calculation unit 112 calculates the amount of intake air Ga corresponding to the second indicated torque Ti2 that is input, based on the intake air amount calculation map. The calculated amount of intake air Ga is output to the throttle flow rate actual value calculation unit 114.

The throttle flow rate actual value calculation unit 114 is a functional block for calculating the actual value mt1 of the throttle flow rate mt from the amount of intake air Ga calculated by the intake air amount calculation unit 112. The throttle flow rate actual value calculation unit 114 is configured in the same manner as the throttle flow rate actual value calculation unit 204 of the comparative example described above. The calculated throttle flow rate actual value mt1 is output to the learning unit 120.

The throttle opening calculation unit 116 is a functional block for calculating the degree of throttle opening TA by using a detection value of the throttle opening sensor 34. The throttle opening calculation unit 116 is configured in the same manner as the throttle opening calculation unit 206 of the comparative example described above. The degree of throttle opening TA calculated by the throttle opening calculation unit 116 is output to the throttle flow rate calculated value calculation unit 118.

The throttle flow rate calculated value calculation unit 118 is a functional block for calculating the calculated value mt2 of the throttle flow rate mt corresponding to the degree of throttle opening TA, by using the flow rate characteristics of the throttle valve 32. The throttle flow rate calculated value calculation unit 118 is configured in the same manner as the throttle flow rate calculated value calculation unit 208 of the comparative example described above. The throttle flow rate calculated value calculation unit 118 calculates the throttle flow rate calculated value mt2 corresponding to the degree of throttle opening TA, by using the flow rate characteristics illustrated in FIG. 3. The calculated throttle flow rate calculated value mt2 is output to the learning unit 120.

The throttle flow rate is affected not only by the degree of throttle opening TA, but also by parameters such as the engine speed NE and front and rear pressures of the throttle valve 32, for example. Accordingly, the throttle flow rate calculated value calculation unit 118 may be configured to calculate the throttle flow rate calculated value mt2 by taking into account parameters such as the engine speed NE and the front and rear pressures of the throttle valve 32, in addition to the degree of throttle opening TA.

The learning unit 120 is a functional block for learning flow rate characteristics setting a relationship between the degree of throttle opening TA and the throttle flow rate mt by comparing the throttle flow rate actual value mt1 input from the throttle flow rate actual value calculation unit 114 and the throttle flow rate calculated value mt2 input from the throttle flow rate calculated value calculation unit 118. The learning unit 120 is configured in the same manner as the learning unit 210 of the comparative example described above. When the throttle flow rate actual value mt1 and the throttle flow rate calculated value mt2 are different from each other, the learning unit 120 rewrites the flow rate characteristics such that the throttle flow rate mt corresponding to the degree of throttle opening TA is taken as the throttle flow rate actual value mt1.

As described above, according to the system of the first embodiment, the amount of intake air is calculated by using the first motor-generator 4 provided in the hybrid vehicle 1, and an airflow meter does not have to be provided. The flow rate characteristics of the throttle may thus be learned with a simple configuration.

The present disclosure is not limited to the first embodiment described above, and a mode which is modified in the following manner may also be adopted within the scope of the present disclosure.

The first embodiment describes an example of a split-type hybrid vehicle, which is capable of freely combining or splitting torque from the engine 2, the first motor-generator 4, and the second motor-generator 6. However, the hybrid vehicle 1 to which the control system of the first embodiment is applied may be a vehicle of a different hybrid type. Such an example modification may be applied to a system of another embodiment described later.

Figure 6:
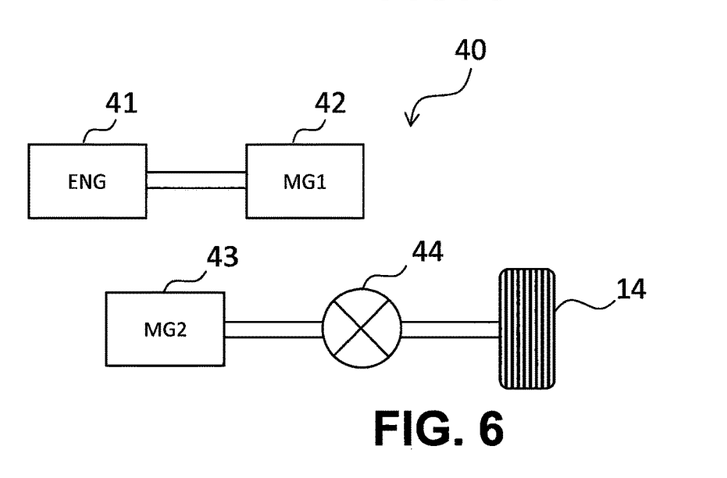
FIG. 6 is a diagram illustrating an example modification of the hybrid vehicle to which the control system of the first embodiment is applied.

FIG. 6 is a diagram illustrating an example modification of the hybrid vehicle to which the control system of the first embodiment is applied. A hybrid vehicle 40 illustrated in the drawing is a so-called series-type hybrid vehicle which uses an engine only for electric power generation, and uses a motor-generator for driving of wheels and regeneration. More specifically, with the hybrid vehicle 40, an engine 41 and a first motor-generator 42 are coupled to each other, and a second motor-generator 43 is coupled to a wheel 14 via a differential gear 44. With such a series-type hybrid vehicle 40, shaft torque Te of the engine 41 is not distributed to the wheel 14 or the second motor-generator 43. Accordingly, the shaft torque Te of the engine 41 may be detected by the first motor-generator 42 during a period when the engine 41 and the first motor-generator 42 are coupled to each other.

Figure 7:
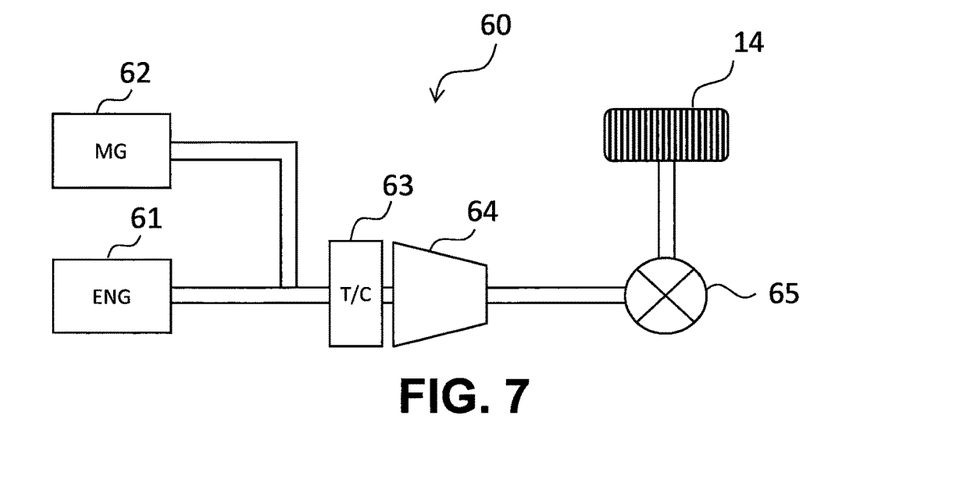
FIG. 7 is a diagram illustrating another example modification of the hybrid vehicle to which the control system of the first embodiment is applied.

FIG. 7 is a diagram illustrating another example modification of the hybrid vehicle to which the control system of the first embodiment is applied. A hybrid vehicle 60 illustrated in the drawing is a so-called parallel-type hybrid vehicle which uses a plurality of power sources including an engine to drive wheels. More specifically, with the hybrid vehicle 60, an engine 61 and a motor-generator 62 are coupled, in parallel to each other, to a transmission 64 including a torque converter 63. Power transmitted to the transmission 64 is transmitted to a wheel 14 via a differential gear 65. With the parallel-type hybrid vehicle 60, shaft torque Te of the engine 61 may be detected by the motor-generator 62 during a period when all of the shaft torque Te of the engine 61 is transmitted to the motor-generator 62.

The first motor-generator 4 may be configured as a generator having only the function of a generator, without including the function of a motor. Such an example modification may also be applied to a system of another embodiment described later.

In the system of the first embodiment described above, the first motor-generator 4 corresponds to the "generator" of a first aspect of the present disclosure, the engine shaft torque detection unit 102 corresponds to the "controller configured to detect shaft torque" of the first aspect, the friction calculation unit 104, the first indicated torque calculation unit 106, the pumping loss calculation unit 108, the second indicated torque calculation unit 110, the intake air amount calculation unit 112, and the throttle flow rate actual value calculation unit 114 correspond to the "controller configured to calculate an actual value of a throttle flow rate" of the first aspect, and the learning unit 120 corresponds to the "controller configured to learn flow rate characteristics" of the first aspect.

Furthermore, in the system of the first embodiment described above, the frictional torque Tf1 and the pumping loss Tf2 correspond to "loss torque" of a second aspect of the present disclosure, the friction calculation unit 104 and the pumping loss calculation unit 108 correspond to the "controller configured to calculate a loss torque" of the second aspect, the first indicated torque calculation unit 106 and the second indicated torque calculation unit 110 correspond to the "controller configured to calculate an indicated torque" of the second aspect, and the intake air amount calculation unit 112 and the throttle flow rate actual value calculation unit 114 correspond to the "controller configured to calculate the actual value of the throttle flow rate" of the second aspect.

2. Second Embodiment 2-1. Feature of Second Embodiment

Figure 8:
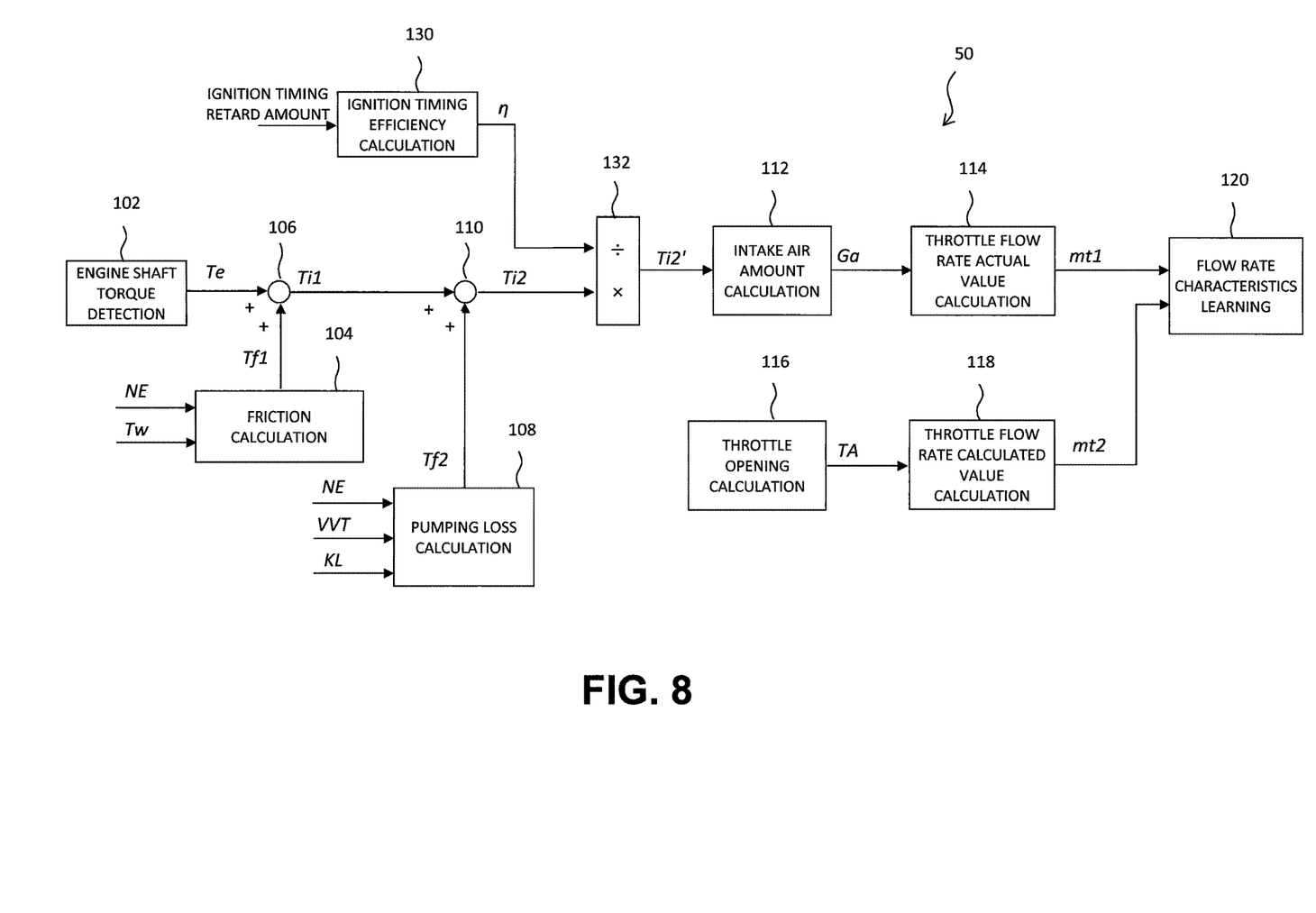
FIG. 8 is a functional block diagram illustrating a configuration of a controller for performing learning control according to a second embodiment.

FIG. 8 is a functional block diagram illustrating a configuration of a controller for performing learning control according to a second embodiment. A controller 50 illustrated in the drawing is configured in the same manner as the controller 50 illustrated in FIG. 4 except that an ignition timing efficiency calculation unit 130 and a torque correction unit 132 are further included.

For example, in a case where the operation state of the engine 2 is in a knocking region, ignition timing retard control of retarding ignition timing efficiency to avoid knocking is sometimes performed. When the ignition timing is retarded, the combustion temperature is reduced, and knocking may be effectively avoided.

However, when the ignition timing is retarded, the ignition timing efficiency is reduced. The ignition timing efficiency refers to a ratio of torque that is actually output to torque that can be output when the ignition timing is the optimal ignition timing (MBT), and is one, which is a maximum value, when the ignition timing is at the optimal ignition timing. That is, when the ignition timing is retarded, torque that is output from the engine 2 is reduced than at the MBT, and thus, the amount of intake air Ga cannot be accurately calculated based on the intake air amount calculation map illustrated in FIG. 5.

Accordingly, the system of the second embodiment further includes the ignition timing efficiency calculation unit 130 and the torque correction unit 132 such that the amount of intake air Ga can be calculated even in a case where the operation state of the engine 2 is in the knocking region.

The ignition timing efficiency calculation unit 130 is a functional block for calculating ignition timing efficiency $\eta$ from an ignition timing retard amount from the MBT. The controller 50 stores an ignition timing efficiency map defining a relationship between the ignition timing retard amount from the MBT and the ignition timing efficiency $\eta$. The ignition timing efficiency calculation unit 130 calculates the ignition timing efficiency $\eta$ corresponding to the ignition timing retard amount from the MBT by using the ignition timing efficiency map. The calculated ignition timing efficiency $\eta$ is output to the torque correction unit 132.

The torque correction unit 132 is a functional block for correcting the second indicated torque Ti2 to torque at a time of MBT operation by using the ignition timing efficiency $\eta$. The torque correction unit 132 divides the input second indicated torque Ti2 by the ignition timing efficiency $\eta$, and a second indicated torque Ti2' after correction is thereby calculated. According to such a calculation, the second indicated torque Ti2' after correction is calculated as a value that is obtained by adding torque corresponding to the amount of reduction in the ignition timing efficiency η from one to the second indicated torque Ti2. The calculated second indicated torque Ti2' after correction is output to the intake air amount calculation unit 112.

Figure 9:
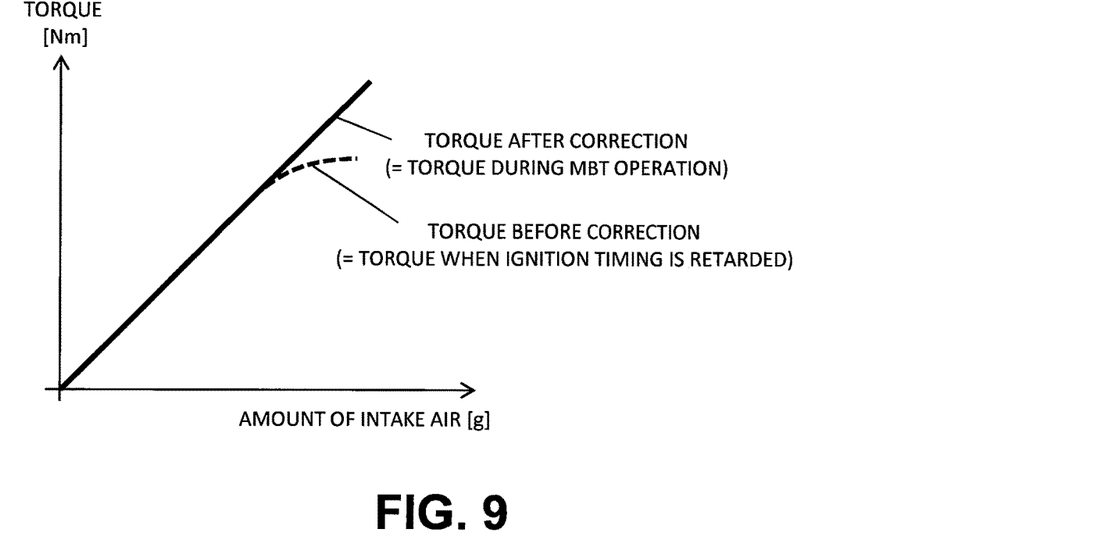
FIG. 9 is a diagram for describing a relationship between an amount of intake air and torque.

The intake air amount calculation unit 112 calculates the amount of intake air Ga from the second indicated torque Ti2' after correction. FIG. 9 is a diagram for describing a relationship between the amount of intake air and torque. As illustrated in the drawing, the second indicated torque Ti2' after correction is the torque at the time of operation at the optimal ignition timing (MBT), and thus, the second indicated torque Ti2' tends to increase in proportion to the amount of intake air Ga. Accordingly, the intake air amount calculation unit 112 may accurately calculate the amount of intake air at the time when the ignition timing is retarded, by calculating the amount of intake air Ga from the second indicated torque Ti2' after correction.

As described above, according to the system of the second embodiment, the amount of intake air Ga may be accurately calculated even in a case where the operation state of the engine 2 is in the knocking region. The flow rate characteristics of the throttle valve 32 may thus be learned regardless of the operation state of the engine 2.

The torque correction unit 132 in the system of the second embodiment described above corresponds to the "controller configured to perform correction" of a third aspect of the present disclosure.

3. Third Embodiment

3-1. Feature of Third Embodiment

A control system for a hybrid vehicle of a third embodiment may be realized by performing a routine illustrated in FIG. 10, described later, by using the hardware configuration illustrated in FIG. 1.

A feature of a system of the third embodiment is control for inhibiting execution of learning control in a case where there is a possibility that erroneous learning is performed in learning control. As conditions for erroneous learning, that the engine 2 is being warmed up, that the operation state of the engine 2 is in the knocking region, and that transient operation of the engine 2 is being performed may be assumed, for example. These conditions are described in greater detail below.

3-1-1. Condition Regarding Warm-Up of Engine

Friction of the engine 2 tends to be more varied during warm-up of the engine 2 than after warm-up. When the friction is greatly varied, errors tend to occur in calculation results of the engine shaft torque detection unit 102, the friction calculation unit 104, and the pumping loss calculation unit 108, and the second indicated torque Ti2 is possibly not accurately calculated.

Accordingly, the system of the third embodiment inhibits execution of learning control during warm-up of the engine 2. Whether the engine 2 is being warmed up or not may be determined based on whether a temperature index value indicating a degree of warm-up of the engine 2 is lower than a predetermined temperature determination value or not. For example, the engine water temperature Tw or the engine oil temperature may be used as such a temperature index value. With such control, execution of learning control is inhibited when the friction of the engine 2 is greatly varied, and erroneous learning is suppressed.

Additionally, a control configuration may also be adopted that allows learning control even during warm-up of the engine 2, if in a special circumstance where it is determined that learning control should be performed. Specifically, learning control may be allowed even during warm-up of the engine 2, in a situation where there is no learning history of learning control or if a current learned value is determined to be greatly shifted from the actual flow rate characteristics, for example.

3-1-2. Condition Regarding Knocking Region

As described above, the intake air amount calculation map illustrated in FIG. 5 is used for calculation of the amount of intake air Ga by the intake air amount calculation unit 112. However, the intake air amount calculation map illustrated in FIG. 5 is a map defining the relationship between the amount of intake air Ga and the second indicated torque Ti2 when the engine 2 is operating at the MBT. Accordingly, if this map is used when the engine 2 is not operating at the MBT, the amount of intake air Ga is possibly not accurately calculated.

Specifically, in the case where the operation state of the engine 2 is in the knocking region, occurrence of knocking is suppressed by ignition timing retard control of retarding the ignition timing from the MBT. Accordingly, if the intake air amount calculation map illustrated in FIG. 5 is used when the operation state of the engine 2 is in the knocking region, the amount of intake air Ga is possibly not accurately calculated.

Accordingly, the system of the third embodiment inhibits execution of learning control, when in the knocking region. According to such control, execution of learning control is inhibited when the engine 2 is not operating at the MBT, and erroneous learning is suppressed.

Additionally, a hybrid vehicle in which a knocking control system for detecting occurrence of knocking by a knock sensor and for retarding the ignition timing is installed may inhibit learning control at a time of operation of the knocking control system. Execution of learning control at a time when the engine 2 is not operating at the MBT is thereby inhibited, and erroneous learning is suppressed.

3-1-3. Condition Regarding Transient Operation of Engine

The amount of change in an engine state amount such as the engine speed NE, the engine load KL, or the load of an auxiliary is greater during transient operation of the engine 2 than in a steady-state operation. Because such engine state amounts are used in calculation by the engine shaft torque detection unit 102, the friction calculation unit 104, and the pumping loss calculation unit 108, errors tend to occur in calculation results.

Accordingly, the system of the third embodiment inhibits execution of learning control during transient operation of the engine 2. Whether the engine 2 is in transient operation or not may be determined based on whether the amount of temporal change in the engine speed NE is greater than a predetermined determination speed or not, whether the amount of temporal change in the engine load KL is greater than a predetermined determination load or not, or whether the amount of temporal change in the load of an auxiliary is greater than a predetermined determination auxiliary load or not, for example. With such control, execution of learning control is inhibited while the second indicated torque Ti2 cannot be accurately calculated, and erroneous learning is suppressed.

3-2. Specific Processing of Third Embodiment

Figure 10:
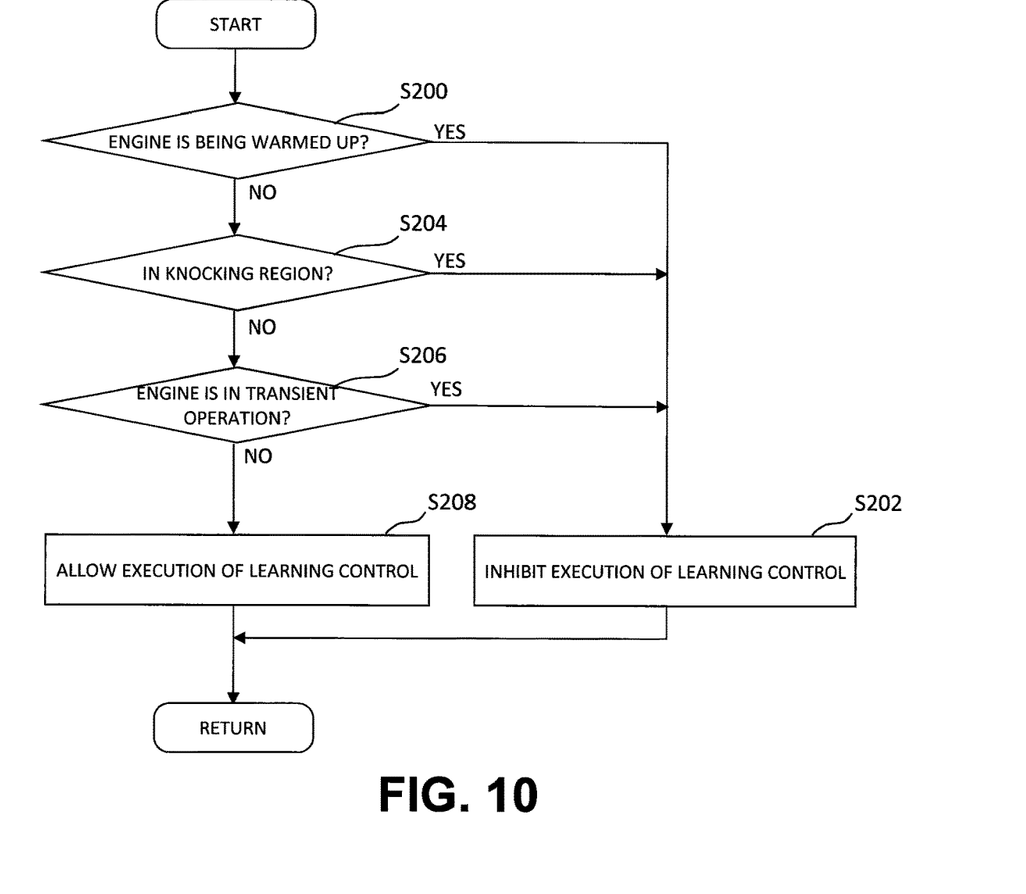
FIG. 10 is a flowchart illustrating a routine that is performed by a controller of a third embodiment.

FIG. 10 is a flowchart illustrating a routine that is performed by the controller 50 of the third embodiment. A processor 502 of the controller 50 executes a program indicated by the flowchart at a predetermined cycle.

In the flowchart illustrated in FIG. 10, first, whether the engine 2 is being warmed up or not is determined (step S200). Specifically, whether the temperature index value for the engine 2 is below a predetermined warm-up determination temperature or not is determined. In the case where positive determination is made, it is determined that there is a possibility of erroneous learning in learning control, and execution of learning control is inhibited (step S202).

In the case where negative determination is made in step S200, the next step is performed, and whether the operation state of the engine 2 is in the knocking region or not is determined (step S204). In the case where positive determination is made, it is determined that there is a possibility of erroneous learning in learning control, and step S202 is performed and execution of learning control is inhibited.

In the case where negative determination is made in step S204, the next step is performed, and whether the engine 2 is in transient operation or not is determined (step S206). Here, it is determined whether the amount of change in the engine speed NE is equal to or greater than the predetermined determination speed or not. In the case where positive determination is made, it is determined that there is a possibility of erroneous learning in learning control, and step S202 is performed and execution of learning control is inhibited. In the case where negative determination is made in step S206, it is determined that there is no possibility of erroneous learning in learning control, and execution of learning control is allowed (step S208).

As described above, with the system of the third embodiment, execution of learning control may be inhibited when the second indicated torque Ti2 cannot be accurately calculated. Erroneous learning in learning control may thereby be effectively suppressed.

What is claimed is:

1. A control system for a hybrid vehicle, the vehicle comprising an internal combustion engine including a throttle valve on an intake air passage, and a generator coupled to an output shaft of the engine, the control system comprising
a controller configured to
detect, using the generator, shaft torque of the output shaft of the engine,
calculate an actual value of a throttle flow rate based on the shaft torque, the throttle flow rate being an amount of air that flows through the throttle valve, and
learn flow rate characteristics indicating a relationship between a throttle opening being a degree of opening of the throttle valve and the throttle flow rate, based on an actual value of the throttle opening and the actual value of the throttle flow rate.

2. The control system for the hybrid vehicle according to claim 1, wherein the controller is configured to
calculate a loss torque that is lost at the engine,
calculate an indicated torque that is torque generated by combustion in the engine, by adding the loss torque to the shaft torque, and
calculate the actual value of the throttle flow rate based on the indicated torque.

3. The control system for the hybrid vehicle according to claim 2,
wherein in a case where an operation state of the engine is in a predetermined knocking region, the engine performs ignition timing retard control of retarding an ignition timing from an optimal ignition timing, and
wherein the controller is configured to perform correction by adding, to the indicated torque, torque corresponding to an amount of reduction in ignition timing efficiency caused by the ignition timing retard control, based on an ignition timing retard amount from the optimal ignition timing caused by the ignition timing retard control.

4. The control system of the hybrid vehicle according to claim 2,
wherein the controller is configured to inhibit learning of the flow rate characteristics, in a case where a temperature index value indicating a degree of warm-up of the engine is lower than a predetermined temperature determination value.

5. The control system of the hybrid vehicle according to claim 1,
wherein the controller is configured to inhibit learning of the flow rate characteristics, in a case where an amount of temporal change in an engine speed of the engine is greater than a predetermined determination speed.

6. The control system of the hybrid vehicle according to claim 1,
wherein the controller is configured to inhibit learning of the flow rate characteristics, in a case where an operation state of the engine is in a predetermined knocking region.

7. The control system for the hybrid vehicle according to claim 1,
wherein the controller is configured to detect the shaft torque in a period when all of the shaft torque of the engine is transmitted to the generator.

* * * * *